United States Patent
Schilder

(10) Patent No.: US 11,628,823 B2
(45) Date of Patent: Apr. 18, 2023

(54) HYBRID DRIVE SYSTEM

(71) Applicant: DAIMLER AG, Stuttgart (DE)

(72) Inventor: Tobias Schilder, Ludwigsburg (DE)

(73) Assignee: MERCEDES-BENZ GROUP AG, Stuttgart (DE)

(*) Notice: Subject to any disclaimer, the term of this patent is extended or adjusted under 35 U.S.C. 154(b) by 0 days.

(21) Appl. No.: 17/595,716

(22) PCT Filed: May 12, 2020

(86) PCT No.: PCT/EP2020/063141
§ 371 (c)(1),
(2) Date: Nov. 23, 2021

(87) PCT Pub. No.: WO2020/239424
PCT Pub. Date: Dec. 3, 2020

(65) Prior Publication Data
US 2022/0250608 A1    Aug. 11, 2022

(30) Foreign Application Priority Data

May 29, 2019  (DE) ...................... 10 2019 003 780.4

(51) Int. Cl.
*B60K 6/36*     (2007.10)
*B60W 20/30*    (2016.01)
(Continued)

(52) U.S. Cl.
CPC ............. *B60W 20/30* (2013.01); *B60K 6/24* (2013.01); *B60K 6/26* (2013.01); *B60K 6/36* (2013.01);
(Continued)

(58) Field of Classification Search
CPC ...... B60W 20/30; B60W 10/02; B60W 10/06; B60W 10/08; B60W 10/113;
(Continued)

(56) References Cited

U.S. PATENT DOCUMENTS

| | | | |
|---|---|---|---|
| 8,961,345 B2* | 2/2015 | Kaltenbach | F16H 37/046 475/5 |
| 2014/0144288 A1* | 5/2014 | Glueckler | B60W 20/00 903/902 |
| 2018/0126839 A1 | 5/2018 | Park | |

FOREIGN PATENT DOCUMENTS

| | | |
|---|---|---|
| DE | 102006036758 A1 | 2/2008 |
| DE | 102011005532 A1 | 9/2012 |

(Continued)

OTHER PUBLICATIONS

International Search Report dated Aug. 10, 2020 in related/corresponding International Application No. PCT/EP2020/063141.

(Continued)

*Primary Examiner* — Roger L Pang
(74) *Attorney, Agent, or Firm* — Patent Portfolio Builders PLLC

(57) ABSTRACT

A hybrid drive system has an internal combustion engine having a crankshaft, an electric motor having a rotor and a stator, a dual clutch transmission having an input shaft, a dual claw clutch having a first claw clutch and a second claw clutch, a first sub-transmission, and a second sub-transmission. The first claw clutch is non-rotatably connects a first sub-transmission input shaft of the first sub-transmission to the input shaft. The second claw clutch non-rotatably connects a second sub-transmission input shaft of the second sub-transmission to the input shaft. The rotor is arranged in such a way that torques starting from the rotor on an output side of the second claw clutch can be introduced into the dual clutch transmission via the second sub-transmission input shaft.

5 Claims, 1 Drawing Sheet

(51) Int. Cl.
*B60W 20/15* (2016.01)
*B60K 6/24* (2007.10)
*B60K 6/26* (2007.10)
*B60K 6/387* (2007.10)
*B60K 6/40* (2007.10)
*B60K 6/48* (2007.10)
*B60K 6/547* (2007.10)
*B60W 10/02* (2006.01)
*B60W 10/06* (2006.01)
*B60W 10/08* (2006.01)
*B60W 10/113* (2012.01)

(52) U.S. Cl.
CPC ............... *B60K 6/387* (2013.01); *B60K 6/40* (2013.01); *B60K 6/48* (2013.01); *B60K 6/547* (2013.01); *B60W 10/02* (2013.01); *B60W 10/06* (2013.01); *B60W 10/08* (2013.01); *B60W 10/113* (2013.01); *B60W 20/15* (2016.01); *B60K 2006/4825* (2013.01); *B60W 2710/021* (2013.01); *B60W 2710/0666* (2013.01); *B60W 2710/083* (2013.01); *B60W 2710/1005* (2013.01); *B60Y 2200/92* (2013.01)

(58) Field of Classification Search
CPC ... B60W 2710/021; B60W 2710/0666; B60W 2710/083; B60W 2710/1005; B60W 30/19; F16H 3/093; F16H 3/006; F16H 2003/0931; B60K 6/24; B60K 6/26; B60K 6/36; B60K 6/387; B60K 6/40; B60K 6/48; B60K 6/547; B60K 2006/4825
USPC ........................................ 477/5; 74/330, 331
See application file for complete search history.

(56) References Cited

FOREIGN PATENT DOCUMENTS

| | | | |
|---|---|---|---|
| DE | 102014203243 A1 | | 8/2015 |
| DE | 102021202814 A1 | * | 9/2022 |
| EP | 2281727 A1 | | 2/2011 |
| JP | 2018001974 A | * | 1/2018 |

OTHER PUBLICATIONS

Written Opinion dated Aug. 10, 2020 in related/corresponding International Application No. PCT/EP2020/063141.

* cited by examiner

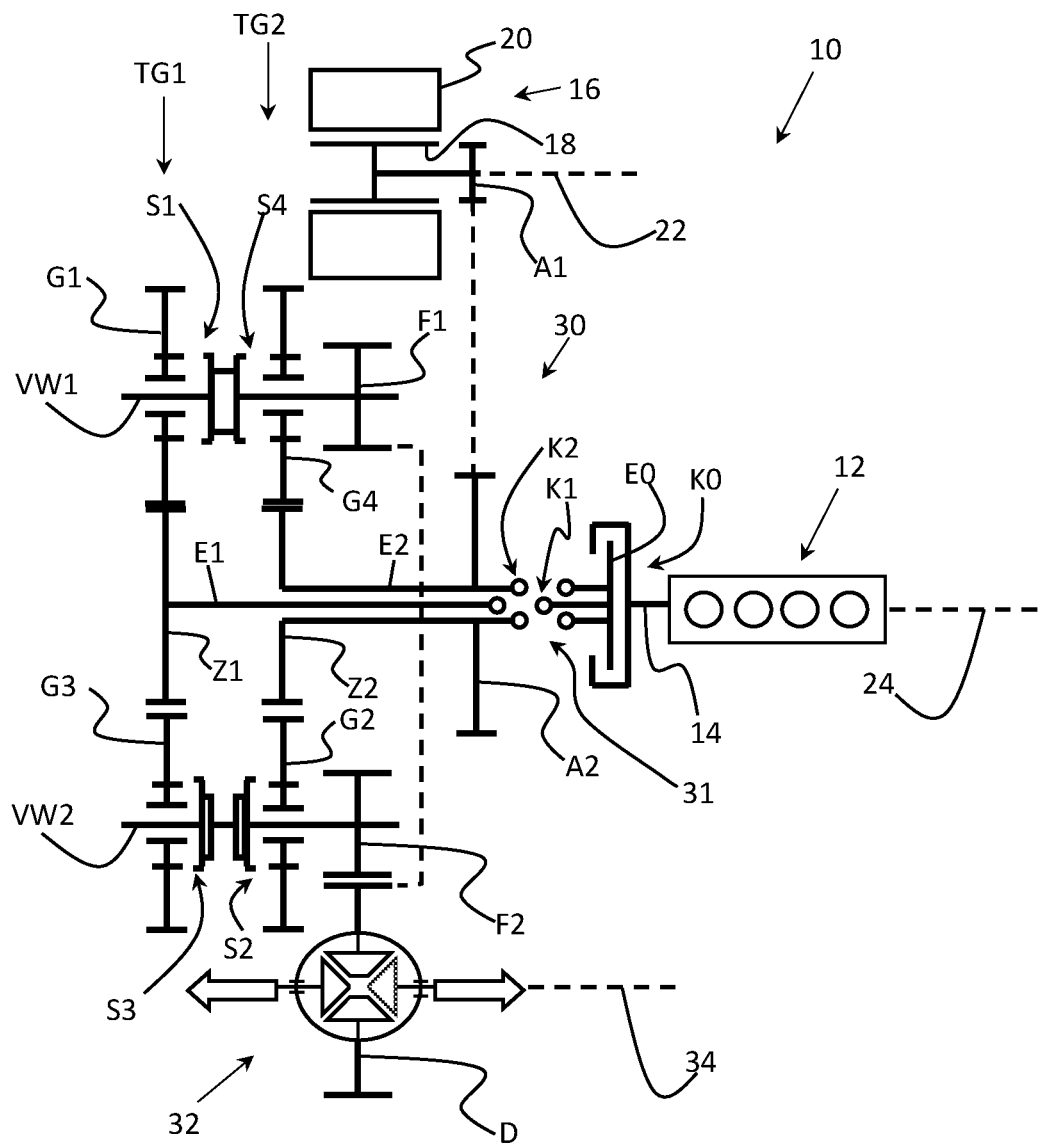

HYBRID DRIVE SYSTEM

BACKGROUND AND SUMMARY OF THE INVENTION

Exemplary embodiments of the invention relate to a hybrid drive system and a method for switching a hybrid drive system.

DE 10 2006 036 758 A1 discloses a hybrid drive system having a dual clutch transmission, which has a dual claw clutch. In this hybrid drive system, two electric motors are provided, one of which is assigned to each of the two sub-transmissions of the dual clutch transmission. By means of the two electric motors and their arrangement, power-shifting of the hybrid drive system is ensured during all gear changes.

Exemplary embodiments of the invention are directed to improving the aforementioned hybrid drive system in such a way that overall manufacturing costs are reduced and the required installation space is reduced, wherein the functionality of the hybrid drive system should not be impaired as far as possible.

The invention starts from a hybrid drive system having an internal combustion engine which has a crankshaft, having an electric motor which has a rotor and a stator, having a dual clutch transmission which has an input shaft, a dual claw clutch having a first claw clutch and a second claw clutch, a first sub-transmission and a second sub-transmission, wherein the first sub-transmission advantageously has a first gear clutch and a third gear clutch, wherein the second sub-transmission advantageously has a second gear clutch, wherein further the first claw clutch is provided to non-rotatably connect a first sub-transmission input shaft of the first sub-transmission to the input shaft, wherein the second claw clutch is provided to non-rotatably connect a second sub-transmission input shaft of the second sub-transmission to the input shaft.

The rotor is arranged in such a way that torques can be introduced from the rotor on a secondary side of the second claw clutch via the second sub-transmission into the dual clutch transmission.

Very advantageously, the rotor is coupled or can be coupled to the second sub-transmission input shaft in such a way that torques can be transmitted from the rotor on the secondary side of the second claw clutch via the second sub-transmission input shaft to the dual clutch transmission.

Advantageously, the internal combustion engine, the dual clutch transmission and an axle drive are arranged one after the other in a torque flow direction in the sequence mentioned.

A sub-transmission is understood to mean a part of the dual clutch transmission comprising spur gear pairs of the dual clutch transmission that are assigned to one of the two sub-transmission input shafts. The spur gear pairs of a sub-transmission comprise such gearwheels arranged coaxially with a respective sub-transmission input shaft and which are or can be non-rotatably coupled to the respective sub-transmission input shaft, as well as gearwheels meshing therewith which are arranged coaxially with one or more countershafts of the dual clutch transmission.

A claw clutch is to be understood as a positive-locking clutch. A gear clutch is understood to mean a clutch of a sub-transmission which is assigned to a switchable spur gear pair of a sub-transmission. Each switchable spur gear pair has a fixed gear and a couplable idler gear. Advantageously, a fixed gear is arranged coaxially with a sub-transmission input shaft and non-rotatably connected to it. Advantageously, each switchable spur gear pair has an idler gear arranged coaxially with a countershaft, which idler gear can be non-rotatably connected to the countershaft by means of the switch clutch. The reverse case is also possible, namely a switchable idler gear on a sub-transmission input shaft and a fixed gear meshing therewith on a countershaft.

A non-rotatable connection of two rotatably mounted elements is to be understood to mean that the two elements are arranged coaxially to each other and are connected to each other in such a way that they rotate with the same angular velocity.

The input shaft of the dual clutch transmission is understood to be a shaft that is arranged between the internal combustion engine and the dual claw clutch with respect to the torque flow starting from the internal combustion engine. This means that torques to be introduced into the dual claw transmission from the internal combustion engine are transmitted in full via the input shaft and further via the dual claw clutch to the sub-transmissions.

The sub-transmission input shafts are arranged downstream of the dual claw clutch with respect to the torque flow. The first sub-transmission input shaft is non-rotatably connected to an output side of the first claw clutch. The second sub-transmission input shaft is non-rotatably connected to an output side of the second claw clutch.

The rotor of the electric motor is connected to the second sub-transmission with regard to the torque flow downstream of the dual clutch.

The rotor is either directly coupled to the second input shaft or can be coupled to the second input shaft via an additional rotor clutch.

The term coupling of two rotatably mounted elements means that the two elements are arranged coaxially or axially parallel to each other and are coupled to each other in such a way that they rotate at a constant speed ratio.

A secondary side of a clutch means the downstream side of the clutch with respect to the torque flow. The secondary side of the clutch thus starts with a downstream clutch half of the clutch.

In accordance with the invention, on the one hand, exactly one electric motor is provided, namely the aforementioned electric motor. On the other hand, in accordance with the invention, a separating clutch designed as a frictionally engaged clutch is provided, which is designed to non-rotatably connect the crankshaft to the input shaft.

The additional separating clutch increases the axial length of the hybrid drive system compared with the prior art. It also increases the control and regulation effort required for certain gear changes. However, compared with the prior art, the overall manufacturing costs can be reduced by eliminating the need for an electric motor.

It has been found that load-interruption-free shifts of sufficient quality are possible with the hybrid drive system according to the invention, provided that the electric motor on the secondary side of the dual clutch is connected to one of the two sub-transmissions and provided that the separating clutch is designed as a frictionally engaged clutch.

A frictionally engaged clutch is understood to mean a clutch with friction discs or, preferably, a multi-plate clutch. The frictionally engaged separating clutch is advantageously used for load-interruption-free gear changes of the hybrid drive system.

Advantageously, during a gear change from an initial gear, in which an internal combustion engine drive takes place, at least the following two steps are carried out in the sequence mentioned:

increasing the torque of the electric motor as well as opening the frictionally engaged separating clutch and engaging an upcoming gear clutch and disengaging an outgoing gear clutch, closing the frictionally engaged separating clutch, increasing the torque of the internal combustion engine, and decreasing the torque of the electric motor.

An internal combustion engine drive means a generation of an output torque emitted by the dual clutch transmission, in which the internal combustion engine either provides all the required torque or in which the internal combustion engine together with the electric motor provides the required torque. The internal combustion engine drive therefore means a drive in which the internal combustion engine provides at least one torque contribution.

Advantageously, a process for a gear change starting from an engaged gear in the first sub-transmission to an engaged gear in the second sub-transmission, to which the electric motor is connected, differs in detail from a process for a gear change starting from an engaged gear in the second sub-transmission to an engaged gear in the first sub-transmission.

Particularly advantageously, for the purpose of a gear change starting from an internal combustion engine drive via the first sub-transmission, in which the separating clutch, the first claw clutch and the first gear clutch of the first sub-transmission are closed, to an internal combustion engine drive via the second sub-transmission, in which the separating clutch, the second claw clutch and the second gear clutch of the second sub-transmission are closed, the following steps are carried out in the sequence mentioned:

closing the second gear clutch,
opening the separating clutch,
opening the first claw clutch and/or opening the first gear clutch,
closing the second claw clutch,
closing the separating clutch (K0).

Further advantageous embodiments of the invention emerge from the following description of the sole FIGURE.

BRIEF DESCRIPTION OF THE DRAWING FIGURE

The sole FIGURE schematically shows a hybrid drive system 10 for a motor vehicle.

DETAILED DESCRIPTION

The hybrid drive system 10 has an internal combustion engine 12, an electric motor 16, both of which act as driving engines for the motor vehicle acting together or each acting alone. Furthermore, the hybrid drive system 10 has a dual clutch transmission 30 and an axle transmission 32. The internal combustion engine 12, the dual clutch transmission 30, and the axle transmission 32 are arranged one after the other with respect to a torque flow starting from the internal combustion engine 12 to the axle transmission 32 in the sequence mentioned. Similarly, the electric motor 16, the dual clutch transmission 30 and the axle transmission 32 are arranged one after the other with respect to a torque flow from the electric motor 16 to the axle transmission 32 in the sequence mentioned.

The electric motor 16 has a stator 20 connected to a housing (not depicted) and a rotor 18 rotatably mounted with respect to the stator. The internal combustion engine 12 has a crankshaft 14.

The dual clutch transmission has an input shaft E0, which can be non-rotatably connected to the crankshaft by means of a separating clutch K0. The input shaft E0 is thus non-rotatably connected to a clutch half arranged on the downstream side with respect to a torque flow emanating from the internal combustion engine 12 or to an output side of the separating clutch K0.

With respect to the torque flow originating from the internal combustion engine 12 downstream of the separating clutch K0 and downstream of the input shaft E0, a dual claw clutch 31 of the dual clutch transmission 30 is arranged. The dual claw clutch 31 has a first claw clutch K1, the input side or the first clutch half of which is non-rotatably connected to the input shaft E0. The dual clutch 31 has a second claw clutch K2, the input side or the first clutch half of which is also non-rotatably connected to the input shaft E0.

The dual clutch transmission 30 has a first sub-transmission TG1 and a second sub-transmission TG2.

The output side or the second clutch half of the first claw clutch K1 is non-rotatably connected to a first sub-transmission input shaft E1 of the first sub-transmission TG1. The output side or the second clutch half of the second claw clutch K2 is non-rotatably connected to a second sub-transmission input shaft E2 of the second sub-transmission TG2.

In other words, the first claw clutch K1 is designed to non-rotatably connect the input shaft E0 and the first sub-transmission input shaft E1 in a closed state. The second claw clutch K2 is designed to non-rotatably connect the input shaft E0 and the second sub-transmission input shaft E2 to each other in a closed state.

According to the invention, the separating clutch K0 is designed as a frictionally engaged clutch and, according to the invention, the electric motor 16 is the only electric motor of the hybrid drive system.

In the context of the invention, it is essential that the rotor 18 of the electric motor 16 is connected in a torque-transmitting manner to one of the two sub-transmissions TG1, TG2 with respect to a torque flow starting from the internal combustion engine 12 downstream of the dual clutch 31. In other words, the rotor 18 is connected to the dual clutch transmission 30 in such a way that torques, starting from the rotor 18, with respect to a torque flow starting from the internal combustion engine 12 are only introduced into the dual clutch transmission 30 downstream of the dual clutch 31.

In the specific exemplary embodiment of the FIGURE, a first linking gearwheel A1 is non-rotatably connected to the rotor 18. In addition, a second linking gearwheel A2 is non-rotatably connected to the second sub-transmission input shaft E2. The first linking gearwheel A1 and the second linking gearwheel A2 are arranged to be permanently engaged with each other. The first linking gearwheel A1 and the second linking gearwheel A2 are coupled to each other in a torque transmitting manner.

Alternatively, a belt drive or one or more spur gear stages could be arranged between the first linking gearwheel A1 and the second linking gearwheel A2. Additionally, with respect to a torque flow, another clutch could be arranged between the first linking gearwheel A1 and the second linkage gearwheel A2 for interrupting and closing the torque flow. Furthermore, it is possible that the second linking gearwheel A2 is omitted and instead the first linking gearwheel A1 is connected to one of the gearwheels G2, G4 of the second sub-transmission TG2 in a torque transmitting manner. In other words, the rotor 18 can be connected to the second sub-transmission TG2 in such a way that torques, starting from the rotor 18, can be introduced into the dual clutch transmission via a second gearwheel G2 or a fourth gearwheel G4.

The first sub-transmission TG1 comprises the first sub-transmission input shaft E1, a first central gear Z1 arranged coaxially with the first sub-transmission input shaft E1, a first gearwheel G1 arranged coaxially with a first countershaft VW1, and a third gearwheel G3 arranged coaxially with a second countershaft VW2.

The first central gear Z1 and the first gearwheel G1 form a first switchable spur gear pair to which a first gear clutch S1 is assigned. The first gear clutch S1 is designed to couple the first sub-transmission input shaft E1 to the first countershaft VW1 via the first switchable spur gear pair in a torque-transmitting manner.

The first central gear Z1 and the third gearwheel G3 form a third switchable spur gear pair to which a third gear clutch S3 is assigned. The third gear clutch S3 is designed to couple the first sub-transmission input shaft E1 to the second countershaft VW2 in a torque-transmitting manner.

In the exemplary embodiment of the FIGURE, the first central gear Z1 is designed as a fixed gear that is non-rotatably connected to the first sub-transmission input shaft E1. The first gearwheel G1 is designed as an idler gear arranged coaxially with the first countershaft VW1; the third gearwheel G3 is designed as an idler gear arranged coaxially with the second countershaft VW2. The first gear clutch S1 is thus arranged coaxially with the first countershaft VW1 and is designed to non-rotatably connect the first gearwheel G1 to the first countershaft VW1. The third gear clutch S3 is arranged coaxially with the second countershaft VW2 and is designed to non-rotatably connect the third gearwheel G3 to the second countershaft VW2.

The second sub-transmission TG2 comprises the second sub-transmission input shaft E2, a second central gear Z2 arranged coaxially with the second sub-transmission input shaft E2, the fourth gearwheel G4 arranged coaxially with the first countershaft VW1, and the second gearwheel G2 arranged coaxially with the second countershaft VW2.

The second central gear Z2 and the fourth gearwheel G1 form a fourth switchable spur gear pair to which a fourth gear clutch S4 is assigned. The fourth gear clutch S4 is designed to couple the second sub-transmission input shaft E2 in a torque-transmitting manner to the first countershaft VW1 via the fourth switchable spur gear pair.

The second central gear Z2 and the second gearwheel G2 form a second switchable spur gear pair to which a second gear clutch S2 is assigned. The second gear clutch S2 is designed to couple the second sub-transmission input shaft E2 in a torque-transmitting manner to the second countershaft VW2 via the second switchable spur gear pair.

In the exemplary embodiment of the FIGURE, the second central gear Z2 is designed as a fixed gear that is non-rotatably connected to the second sub-transmission input shaft E2. The fourth gearwheel G4 is designed as an idler gear arranged coaxially with the first countershaft VW1, and the second gearwheel G2 is designed as an idler gear arranged coaxially with the second countershaft VW2. The fourth gear clutch S4 is consequently arranged coaxially with the first countershaft VW1 and is designed to non-rotatably connect the fourth gearwheel G4 to the first countershaft VW1. The second gear clutch S2 is arranged coaxially with the second countershaft VW2 and is designed to non-rotatably connect the second gearwheel G2 to the second countershaft VW2.

In order to output torques from the dual clutch transmission 30, a first output gear F1 is arranged on the first countershaft and a second output gear F2 is arranged on the second countershaft. The first output gear F1 is non-rotatably connected to the first countershaft VW1, and the second output gear F2 is non-rotatably connected to the second countershaft VW2.

Both the first output gear F1 and the second output gear F2 mesh with a differential input gear D of the axle drive 32. Starting from the output gears F1, F2, torques from the dual clutch transmission are thus introduced into the axle drive 32.

A rotor rotational axis 22 of the rotor 18, a crankshaft rotational axis 24 of the crankshaft 14 and a side shaft rotational axis 34 of the axle transmission 32 are all arranged axially parallel to and axially offset from one another.

For the purpose of a gear change, starting from an internal combustion engine drive via the first sub-transmission TG1, in which the separating clutch K0, the first claw clutch K1, and the first gear clutch S1 of the first sub-transmission are closed, the second claw clutch is advantageously open, to an internal combustion engine drive via the second sub-transmission TG2, in which the separating clutch K0, the second claw clutch K2 and the second gear clutch S2 of the second sub-transmission TG2 are closed and the first claw clutch is advantageously open, the following steps, each delimited by the indents, are carried out particularly advantageously in the sequence mentioned:

- closing the second gear clutch S2, or generally with respect to the invention: engaging a target gear in the second sub-transmission TG2, and advantageously reducing a torque of the internal combustion engine 12 and increasing a torque of the electric motor 16,
- opening the separating clutch K0, such that, after completion of this step, a purely electric drive is now provided in the meantime via the dual clutch transmission 30,
- opening the first claw clutch K1 and/or opening the first gear clutch S1,
- closing the second claw clutch K2, wherein both the first claw clutch K1 and the first gear clutch S1 must be open at the latest when this step is completed,
- closing the separating clutch (K0), increasing the torque of the internal combustion engine 12 and reducing the torque of the electric motor 16.

The term internal combustion engine drive means a type of drive in which the internal combustion engine 12 is at least partially involved. Thus, both a drive type with the internal combustion engine 12 as the only drive source and a drive type with the internal combustion engine 12 and the electric motor 16 as a common drive source are meant.

For the purpose of a gear change starting from an internal combustion engine drive via the second sub-transmission TG2, in which the separating clutch K0, the second claw clutch K2, and the second gear clutch S2 of the second sub-transmission TG2 are closed, to an internal combustion engine drive via the first sub-transmission TG1, in which the separating clutch K0, the first claw clutch K1, and the third gear clutch S3 of the first sub-transmission TG1 are closed, the following steps, delimited by indents, are carried out in the sequence mentioned:

- increasing a torque provided by the electric motor 16 and reducing a torque provided by the internal combustion engine 12, and opening the separating clutch K0 and the second claw clutch K2, such that at the end of this method step, the electric motor 16 acts as the only drive source in the meantime,
- coupling the input shaft E0 to the first output gear F1, advantageously by closing the first claw clutch K1 and closing the third gear clutch S3, wherein one of the two clutches, the claw clutch K1 or the gear clutch S3 can be closed even in the previous step, closing the separating clutch K0 and reducing the torque provided by the electric motor 16 and increasing the torque provided by the internal combustion engine.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERAL LIST 10 hybrid drive system
12 internal combustion engine
14 crankshaft
16 electric motor
18 rotor
20 stator
22 rotor rotational axis
24 crankshaft rotational axis
30 dual clutch transmission
31 dual claw clutch
32 axle transmission
34 side shaft rotational axis
A1 first linking gearwheel
A2 second linking gearwheel
D differential input gear
E0 input shaft
E1 first sub-transmission input shaft
E2 second sub-transmission input shaft
G1 first gearwheel
G2 second gearwheel
G3 third gearwheel
G4 fourth gearwheel
F1 first output gear
F2 second output gear
K0 separating clutch
K1 first claw clutch
K2 second claw clutch
S1 first gear clutch
S2 second gear clutch
S3 third gear clutch
S4 fourth gear clutch
TG1 first sub-transmission
TG2 second sub-transmission
VW1 first countershaft
VW2 second countershaft
Z1 first central gear
Z2 second central gear

The invention claimed is:

1. A hybrid drive system, comprising:
an internal combustion engine comprising a crankshaft; an electric motor comprising a rotor and a stator; and
a dual clutch transmission comprising an input shaft, a first sub-transmission, a second sub-transmission, and a dual claw clutch comprising a first claw clutch and a second claw clutch,
wherein the first sub-transmission comprises a first gear clutch and a third gear clutch,
wherein the second sub-transmission comprises a second gear clutch,
wherein the first claw clutch non-rotatably connects a first sub-transmission input shaft of the first sub-transmission to the input shaft,
wherein the second claw clutch non-rotatably connects a second sub-transmission input shaft of the second sub-transmission to the input shaft,
wherein the rotor is configured in such a way that torques starting from the rotor on a secondary side of the second claw clutch are introducible into the dual clutch transmission via the second sub-transmission such that the torques starting from the rotor, with respect to a torque flow starting from the internal combustion engine, are only introduced into the dual clutch transmission downstream of the dual claw clutch,
wherein the electric motor is the only motor of the hybrid drive system,
wherein a separating clutch, which is a frictionally engaged clutch, non-rotatably connects the crankshaft to the input shaft,
wherein the first sub-transmission comprises a first central gear arranged coaxially with the first sub-transmission input shaft, a first gearwheel arranged coaxially with a first countershaft, and a third gearwheel arranged coaxially with a second countershaft,
wherein the first central gear and the first gearwheel form a first switchable spur gear pair, and the first gear clutch is configured to couple the first sub-transmission input shaft to the first countershaft via the first switchable spur gear pair in a torque-transmitting manner,
wherein the second sub-transmission comprises a second central gear arranged coaxially with the second sub-transmission input shaft, and a second gearwheel arranged coaxially with the second countershaft, and
wherein the second central gear and the second gearwheel form a second switchable spur gear pair, and the second gear clutch is configured to couple the second sub-transmission input shaft in a torque-transmitting manner to the second countershaft via the second switchable spur gear pair.

2. The hybrid drive system of claim 1, wherein
a first output gear is arranged on the first countershaft and a second output gear is arranged on the second countershaft,
the first output gear is non-rotatably connected to the first countershaft, and the second output gear is non-rotatably connected to the second countershaft, and
the first output gear and the second output gear mesh with a differential input gear of an axle drive.

3. A method for switching a hybrid drive system, which comprises an internal combustion engine comprising a crankshaft; an electric motor comprising a rotor and a stator; and a dual clutch transmission comprising an input shaft, a first sub-transmission, a second sub-transmission, and a dual claw clutch comprising a first claw clutch and a second claw clutch, wherein the first sub-transmission comprises a first gear clutch and a third gear clutch, wherein the second sub-transmission comprises a second gear clutch, wherein the first claw clutch non-rotatably connects a first sub-transmission input shaft of the first sub-transmission to the input shaft, wherein the second claw clutch non-rotatably connects a second sub-transmission input shaft of the second sub-transmission to the input shaft, wherein the rotor is configured in such a way that torques starting from the rotor on a secondary side of the second claw clutch are introducible into the dual clutch transmission via the second sub-transmission, wherein the electric motor is the only motor of the hybrid drive system, and wherein a separating clutch, which is a frictionally engaged separating clutch, non-rotatably connects the crankshaft to the input shaft, the method comprising:

changing a gear of the hybrid drive system by, starting from an internal combustion engine drive in a first gear to an internal combustion engine drive in a second gear, performing at least the following two steps A and B in the sequence mentioned:

Step A: increasing a torque of the electric motor and opening the frictionally engaged separating clutch and engaging an upcoming gear clutch, and Step B: closing the frictionally engaged separating clutch, increasing a torque of the internal combustion engine, and decreasing the torque of the electric motor.

4. The method of claim 3, further comprising:

changing the gear of the hybrid drive system starting from an internal combustion engine drive via the first sub-transmission, in which the separating clutch, the first claw clutch and the first gear clutch of the first sub-transmission are closed, to an internal combustion engine drive via the second sub-transmission, in which the frictionally engaged separating clutch, the second claw clutch and the second gear clutch of the second sub-transmission are closed, the following steps 1a to 5a are carried out in the sequence mentioned:

Step 1a: closing the second gear clutch,

Step 2a: opening the frictionally engaged separating clutch,

Step 3a: opening the first claw clutch or opening the first gear clutch,

Step 4a: closing the second claw clutch, and

Step 5a: closing the frictionally engaged separating clutch.

5. The method of claim 3, further comprising:

changing the gear of the hybrid drive system starting from an internal combustion engine drive via the second sub-transmission, in which the frictionally engaged separating clutch, the second claw clutch, and the second gear clutch of the second sub-transmission are closed, to an internal combustion engine drive via the first sub-transmission, in which the frictionally engaged separating clutch, the first claw clutch, and the third gear clutch of the first sub-transmission are closed, the following steps 1b to 3b are carried out in the sequence mentioned:

Step 1b: opening the frictionally engaged separating clutch and the second claw clutch, Step 2b: coupling the input shaft to a first output gear of the first sub-transmission, Step 3b: closing the frictionally engaged separating clutch.

* * * * *